US012752673B2

(12) United States Patent
Jung et al.

(10) Patent No.: US 12,752,673 B2
(45) **Date of Patent: *Oct. 6, 2026**

(54) SEAT FOR VEHICLE

(71) Applicants: Hyundai Motor Company, Seoul (KR); Kia Corporation, Seoul (KR)

(72) Inventors: Chan Ho Jung, Seoul (KR); Ho Suk Jung, Seoul (KR); Han Kyeol Cho, Seoul (KR); Hyeok Seung Lee, Seoul (KR); Da Eun Lee, Seoul (KR); Hoon Bok Lee, Seoul (KR); Jun Young Yun, Seoul (KR); Jun Hwan Lee, Seoul (KR); Sang Do Park, Seoul (KR); Sang Hark Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 153 days.

This patent is subject to a terminal disclaimer.

(21) Appl. No.: 18/754,441

(22) Filed: Jun. 26, 2024

(65) Prior Publication Data

US 2024/0343167 A1 Oct. 17, 2024

Related U.S. Application Data

(63) Continuation of application No. 17/743,847, filed on May 13, 2022, now Pat. No. 12,043,145.

(30) Foreign Application Priority Data

Aug. 3, 2021 (KR) ........................ 10-2021-0101860

(51) Int. Cl.

*B60N 2/02* (2006.01)
*B60N 2/12* (2006.01)
*B60N 2/68* (2006.01)

(52) U.S. Cl.

CPC ........... *B60N 2/12* (2013.01); *B60N 2/02246* (2023.08); *B60N 2/68* (2013.01)

(58) Field of Classification Search

CPC .......... B60N 2/143; B60N 2/203; B60N 2/10; B60N 2/12; B60N 2/02246; B60N 2/68

See application file for complete search history.

(56) References Cited

U.S. PATENT DOCUMENTS 3,743,350 A * 7/1973 Allen ................. A47C 17/1756 5/47
5,098,154 A * 3/1992 Emery ................. B60N 2/0292 297/328

(Continued)

FOREIGN PATENT DOCUMENTS

DE 102019100670 A1 * 7/2019 ........... B60N 2/3095
KR 20090126045 A 12/2009

OTHER PUBLICATIONS

English translation of DE-102019100670-A1. (Year: 2019).*

*Primary Examiner* — David R Dunn
*Assistant Examiner* — Troy Alan Libby
(74) *Attorney, Agent, or Firm* — Fox Rothschild LLP

(57) ABSTRACT

A seat for a vehicle includes support links enabling a rotating motion and a sliding motion between a seat frame and seat rails, the support links being mounted so that the seat may be rotated in the forward and rearward directions as in a seesaw motion about a shaft of the vehicle in a width direction of the vehicle, so as to easily implement a facing mode posture, in which passengers sit facing each other, a relaxed comfort posture, etc.

13 Claims, 7 Drawing Sheets

(56) References Cited

U.S. PATENT DOCUMENTS

| | | | | |
|---|---|---|---|---|
| 7,156,442 | B2 * | 1/2007 | McManus | B60N 2/933<br>296/65.09 |
| 7,726,730 | B2 * | 6/2010 | Peter | B60N 2/072<br>297/483 |
| 11,820,256 | B2 | 11/2023 | Jung et al. | |
| 2010/0066146 | A1 | 3/2010 | Weber et al. | |
| 2011/0025106 | A1 | 2/2011 | Okamoto et al. | |
| 2013/0200675 | A1 | 8/2013 | Beneker et al. | |
| 2015/0239373 | A1 | 8/2015 | Weng et al. | |
| 2015/0375647 | A1 | 12/2015 | Behrens | |
| 2016/0107549 | A1 | 4/2016 | Janicek et al. | |
| 2018/0065509 | A1 | 3/2018 | Ohashi | |
| 2020/0353845 | A1 * | 11/2020 | Matsuzawa | B60N 2/838 |
| 2023/0166644 | A1 * | 6/2023 | Yun | B60N 2/3065<br>297/311 |

* cited by examiner

SEAT FOR VEHICLE

CROSS-REFERENCE TO RELATED APPLICATION

This application is a Continuation of U.S. patent application Ser. No. 17/743,847, filed on May 13, 2022, which claims under 35 U.S.C. § 119 (a) the benefit of Korean Patent Application No. 10-2021-0101860 filed on Aug. 3, 2021, the entire contents of which are incorporated herein by reference.

BACKGROUND

(a) Technical Field

The present disclosure relates to a seat for a vehicle, more particularly, to the seat for a vehicle which may easily implement a rear facing mode posture, in which passengers sit facing each other, a relaxed comfort posture, etc.

(b) Description of the Related Art

In an autonomous vehicle, swivel-type (rotation-type) seats may be mounted so as to be rotated at a designated angle in a desired direction so as to have a group meeting and conversation, to enjoy the view outside windows, etc.

In general, a conventional seat swivel mechanism is configured such that, in order to enable passengers sitting on a first row seat or a second row seat to face passengers sitting on the seat just behind the first row seat or the second row seat, the first or second row seat is rotated about an H shaft (height shaft of the vehicle).

However, the H shaft-based swivel mechanism requires interlocking of many parts, and is thus very complicated and causes increases in weight and production cost.

Particularly, because the interior space of the vehicle is restricted, when the seat is rotated about the H shaft (height shaft of the vehicle), the seat may interfere with peripheral parts (for example, a console, a door trim, a center pillar, etc.), and thus, it may be difficult to secure the rotational trajectory of the seat.

The above information disclosed in this Background section is only for enhancement of understanding of the background of the disclosure and therefore it may contain information that does not form the prior art that is already known in this country to a person of ordinary skill in the art.

SUMMARY

The present disclosure provides a seat for a vehicle in which support links enabling a rotating motion and a sliding motion between a seat frame and seat rails are mounted so that the seat may be rotated in the forward and rearward directions as in a seesaw motion about a shaft of the vehicle in a width direction of the vehicle, so as to easily implement a facing mode posture, in which passengers sit facing each other, a relaxed comfort posture, etc.

In one aspect, the present disclosure provides a seat for a vehicle including a seat frame configured such that a first seat frame part and a second seat frame part are formed integrally with each other at a designated angle, seat rails, each seat rail including a stationary rail and a movable rail mounted on the stationary rail so as to be movable forwards and rearwards, a pair of first support links provided with front ends connected to the first seat frame part using hinges and rear ends connected to rear parts of the movable rails of the seat rails using hinges, a pair of second support links provided with front ends connected to front parts of the movable rails of the seat rails using hinges and rear ends connected to the second seat frame part using hinges, a suspension device fixedly mounted on a support plate connected to the stationary rails of the seat rails and connected to a boundary between the first seat frame part and the second seat frame part using a hinge, and a driving device fixedly mounted on the support plate so as to push or pull one of the first support links and the second support links.

In a preferred embodiment, the first support links may be disposed to be inclined downwards from the front ends thereof to the rear ends thereof, the second support links may be disposed to be inclined downwards from the rear ends thereof to the front ends thereof, and thus, the first support links and the second support links may be disposed to cross each other.

In another preferred embodiment, first hinge brackets hinge-coupled to the front ends of the first support links may be provided at a lower part of the first seat frame part, second hinge brackets hinge-coupled to the rear ends of the second support links may be provided at a lower part of the second seat frame part, and a third hinge bracket hinge-coupled to the suspension device may be provided at a lower part of the boundary between the first seat frame part and the second seat frame part.

In still another preferred embodiment, a distance between the first hinge brackets and the third hinge bracket and a distance between the second hinge brackets and the third hinge bracket may be set to be equal to each other.

In yet another preferred embodiment, the rear ends of the first support links may be hinge-coupled to first support brackets mounted at the rear parts of the movable rails, and the front ends of the second support links may be hinge-coupled to second support brackets mounted at the front parts of the movable rails.

In still yet another preferred embodiment, the driving device may include a first motor mounted on the support plate, a first gear box mounted at an output shaft of the first motor, a lead screw coupled to the first gear box so as to be movable forwards or rearwards, a first connection plate configured to connect the rear ends of the first support links provided in a pair, a second connection plate configured to connect the front ends of the second support links provided in a pair, and a push-pull link configured to connect a rear end of the lead screw and the first connection plate, or configured to connect a front end of the lead screw and the second connection plate.

In a further preferred embodiment, the suspension device may include a guide pipe mounted on the support plate and configured to have a designated height, a spring installed in the guide pipe so as to be compressible, and a guide link provided with an upper end connected to a third hinge bracket provided on the boundary between the first seat frame part and the second seat frame part using a hinge, and a lower end inserted into the guide pipe and connected to an upper end of the spring, so as to be rectilinearly moved upwards and downwards.

In another further preferred embodiment, in order to assure upward and downward rectilinear movement of the guide link, a guide hole configured to extend in a vertical direction may be formed in the guide pipe, and a guide pin inserted into the guide hole may protrude from the guide link.

In still another further preferred embodiment, a first leg rest frame also used as a headrest frame may be mounted at a distal end of the first seat frame part, and a second leg rest frame also used as the headrest frame may be mounted at a distal end of the second seat frame part.

In yet another further preferred embodiment, the first leg rest frame may be mounted at first mounting brackets mounted at the distal end of the first seat frame part by a first hinge shaft such that an angle of the first leg rest frame is adjustable, and the second leg rest frame may be mounted at second mounting brackets mounted at the distal end of the second seat frame part by a second hinge shaft such that an angle of the second leg rest frame is adjustable.

In still yet another further preferred embodiment, a second gear box connected to an output shaft of a second motor may be mounted on the first hinge shaft so as to transmit rotating force to the first hinge shaft, and a third gear box connected to an output shaft of a third motor may be mounted on the second hinge shaft so as to transmit rotating force to the second hinge shaft.

In a still further preferred embodiment, the first seat frame part and the second seat frame part may be provided to have the same shape, and the first leg rest frame and the second leg rest frame may be provided to have the same shape.

Other aspects and preferred embodiments of the disclosure are discussed infra.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
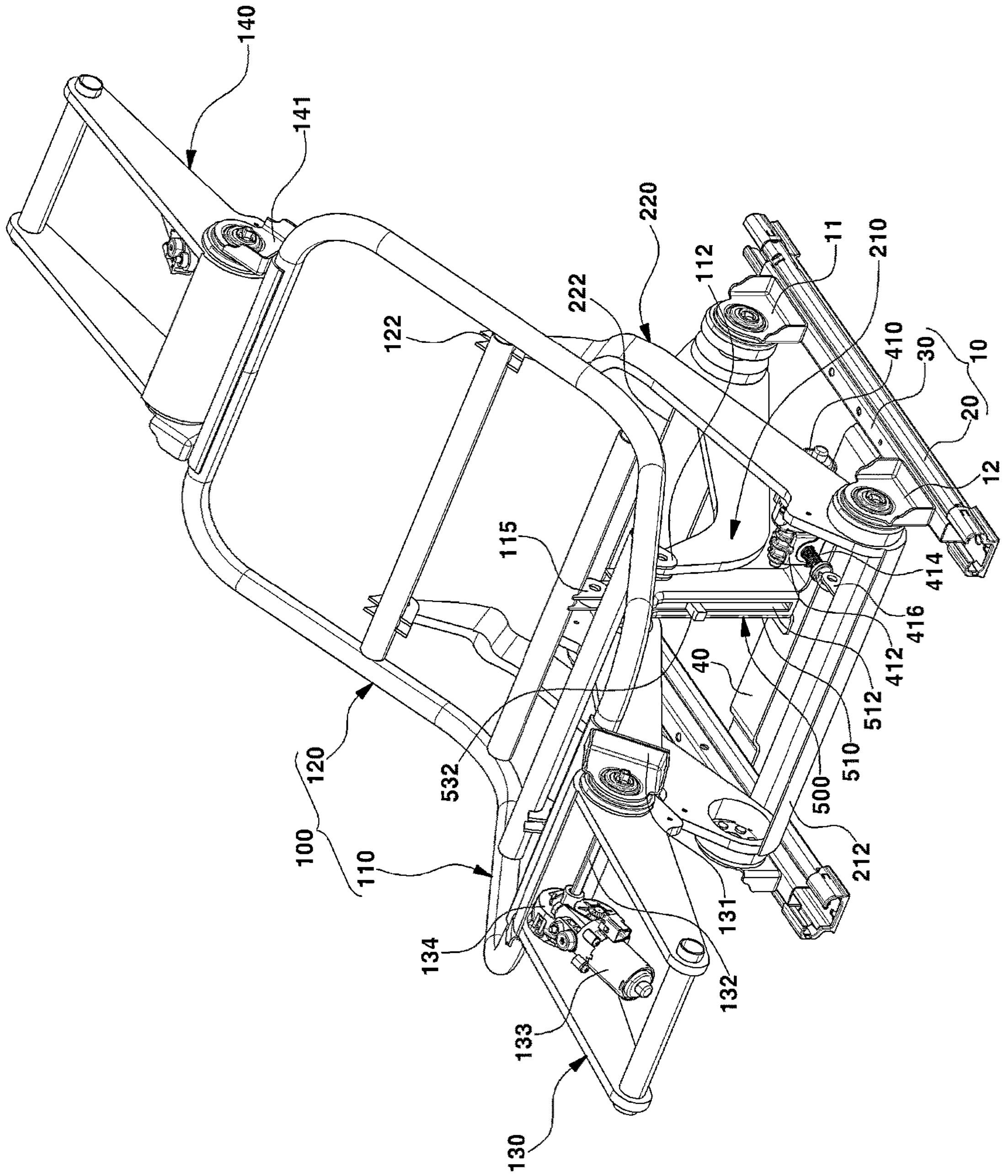
FIG. 1 is an assembled perspective view of a seat for a vehicle according to the present disclosure, as seen from the front.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Hereinafter reference will be made in detail to various embodiments of the present disclosure, examples of which are illustrated in the accompanying drawings and described below. While the disclosure will be described in conjunction with exemplary embodiments, it will be understood that present description is not intended to limit the disclosure to the exemplary embodiments. On the contrary, the disclosure is intended to cover not only the exemplary embodiments, but also various alternatives, modifications, equivalents and other embodiments, which may be within the spirit and scope of the disclosure as defined by the appended claims.

It is understood that the term “vehicle” or “vehicular” or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms “a,” “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof. As used herein, the term “and/or” includes any and all combinations of one or more of the associated listed items. Throughout the specification, unless explicitly described to the contrary, the word “comprise” and variations such as “comprises” or “comprising” will be understood to imply the inclusion of stated elements but not the exclusion of any other elements. In addition, the terms “unit”, “-er”, “-or”, and “module” described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Figure 2:
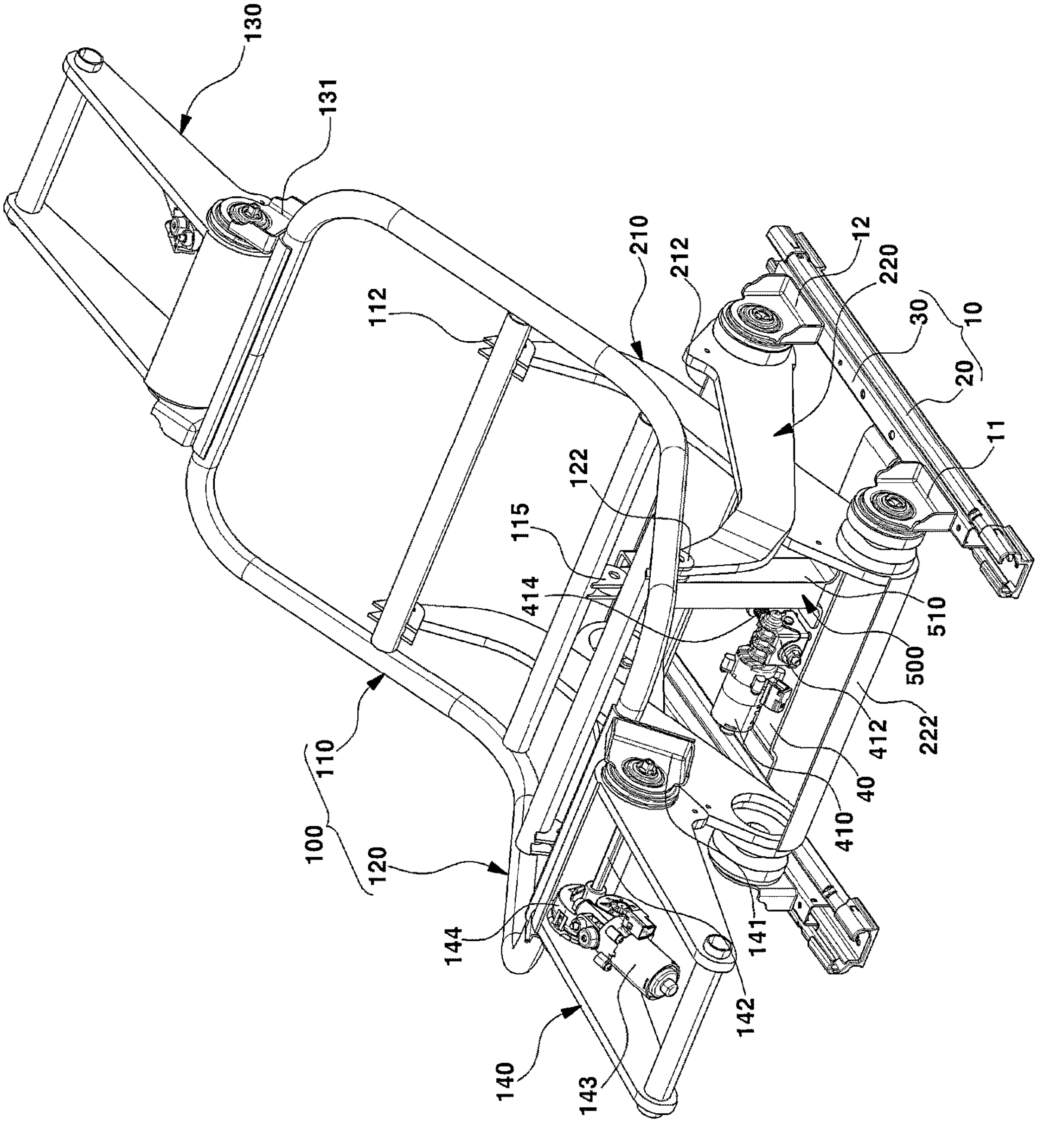
FIG. 2 is an assembled perspective view of the seat for a vehicle according to the present disclosure, as seen from the rear.

FIG. 1 is an assembled perspective view of a seat for a vehicle according to the present disclosure, as seen from the front, and FIG. 2 is an assembled perspective view of the seat for a vehicle according to the present disclosure, as seen from the rear. In the respective figures, reference numeral 100 indicates a seat frame.

The seat frame 100 is manufactured to have a structure in which a first seat frame part 110 and a second seat frame part 120 are formed integrally with each other at a designated angle.

Particularly, the first seat frame part 110 and the second seat frame part 120 may be manufactured to have the same shape, and thereby, the second seat frame part 120 may be used as a seat cushion when the first seat frame part 110 is used as a seat back, and the second seat frame part 120 may be used as a seat back when the first seat frame part 110 is used as a seat cushion.

The first seat frame part 110 is supported by a pair of first support links 210 connected to seat rails 10 so as to be rotatable forwards and rearwards, and the second seat frame part 120 is supported by a pair of second support links 220 connected to the seat rails 10 so as to be rotatable forwards and rearwards.

In general, each of the seat rails 10 includes a stationary rail 20 fixedly mounted on a floor panel, and a movable rail 30 coupled to the stationary rail 20 so as to be slidable forwards and rearwards.

Therefore, the front ends of the first support links 210 overlap with first hinge brackets 112 formed at the lower part of the first seat frame part 110 and are connected thereto using hinges, and the rear ends of the first support links 210 overlap with first support brackets 11 mounted on the rear parts of the movable rails 30 of the seat rails 10 and are connected thereto using hinges.

Further, the front ends of the second support links 220 overlap with second support brackets 12 mounted on the front parts of the movable rails 30 of the seat rails 10 and are connected thereto using hinges, and the rear ends of the second support links 220 overlap with second hinge brackets 122 formed at the lower part of the second seat frame part 120 and are connected thereto using hinges.

Therefore, the first support links 210 are disposed to be inclined downwards from the front ends thereof connected to the first hinge brackets 112 of the first seat frame part 110 to the rear ends thereof connected to the first support brackets 11, the second support links 220 are disposed to be inclined downwards from the rear ends thereof connected to the second hinge brackets 122 of the second seat frame part 120 to the front ends thereof connected to the second support brackets 12, and thus, the first support links 210 and the second support links 220 are disposed to cross each other in an X shape.

Here, a third hinge bracket 115 which is connected to a suspension device 500, which will be described below, using a hinge is formed at the lower part of the boundary between the first seat frame part 110 and the second seat frame part 120.

Particularly, in order to perform a seesaw motion between the first seat frame part 110 and the second seat frame part 120 of the seat frame 100, a distance between the first hinge brackets 112 and the third hinge bracket 115 and a distance between the second hinge bracket 122 and the third hinge bracket 115 may be set to be equal to each other.

The seat for a vehicle according to the present disclosure includes a driving device configured to rotate the seat frame 100 including the first seat frame part 110 and the second seat frame part 120 forwards and rearwards as in the seesaw motion.

For this purpose, the driving device includes a first motor 410 mounted on a support plate 40 configured to connect the stationary rails 20 to each other, a first gear box 412 mounted at the output shaft of the first motor 410, a lead screw 414 coupled to the first gear box 412 so as to be movable forwards or rearwards, a first connection plate 212 configured to integrally connect the rear ends of the first support links 210 provided in a pair and disposed in the width direction of the vehicle, a second connection plate 222 configured to integrally connect the front ends of the second support links 220 provided in a pair and disposed in the width direction of the vehicle, and a push-pull link 416 configured to connect the rear end of the lead screw 414 and the first connection plate 212 using hinges or configured to connect the front end of the lead screw 414 and the second connection plate 222 using hinges.

In order to assist in understanding of the present disclosure, FIGS. 1 and 2 and FIGS. 4, 5, and 6 illustrate that the push-pull link 416 of the driving device is configured to connect the front end of the lead screw 414 and the second connection plate 222 using hinges.

For reference, a nut gear (not shown) engaged with the lead screw 414 is installed as an output gear in the first gear box 412, and thus, when the nut gear idles, the lead screw 414 may be moved forwards or rearwards.

According to the present disclosure, the suspension device 500 configured to support the boundary between the first seat frame part 110 and the second seat frame part 120 so that the boundary between the first seat frame part 110 and the second seat frame part 120 is movable upwards and downwards is mounted on the support plate 40.

Figure 3A:
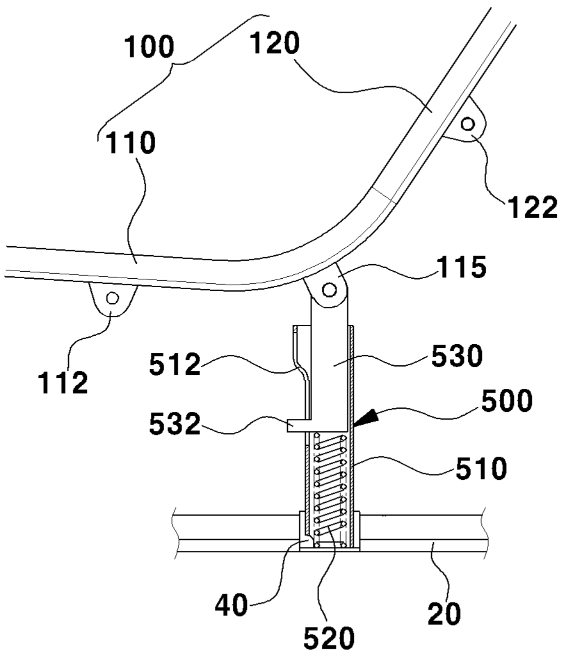
FIGS. 3A to 3C are enlarged cross-sectional views illustrating an essential portion of a suspension device of the seat for a vehicle according to the present disclosure.
Figure 3B:
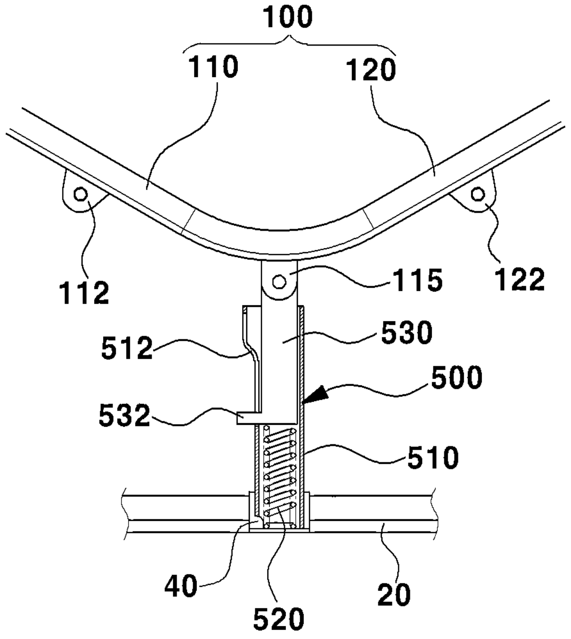
Figure 3C:
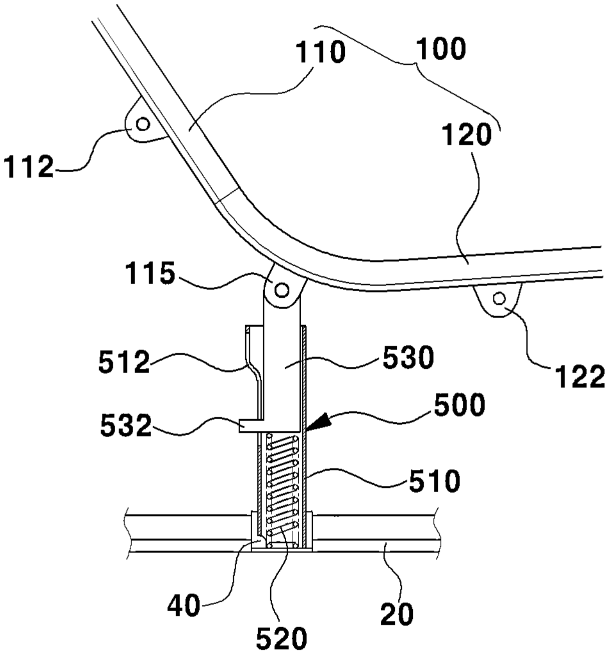

In more detail, the suspension device 500 includes, as shown in FIGS. 3A to 3C, a guide pipe 510 mounted on the support plate 40 and configured to have a designated height, a spring 520 installed in the guide pipe 510 so as to be compressible, and a guide link 530 configured to support the boundary between the first seat frame part 110 and the second seat frame part 120 and inserted into the guide pipe 510 so as to be rectilinearly movable upwards and downwards.

Here, the upper end of the guide link 530 is connected to the third hinge bracket 115 formed on the lower part of the boundary between the first seat frame part 110 and the second seat frame part 120 using the hinge, and the lower end of the guide link 530 is inserted into the guide pipe 510 and connected to the upper end of the spring 520 so as to compress the spring 520.

Particularly, in order to assure the upward and downward rectilinear movement of the guide link 530, a guide hole 512 extending in the vertical direction may be formed in the guide pipe 510, and a guide pin 532 inserted into the guide hole 512 may protrude from the guide link 530.

Therefore, when the seat frame 100 including the first seat frame part 110 and the second seat frame part 120 is rotated forwards or rearwards, the boundary between the first seat frame part 110 and the second seat frame part 120 is slightly moved downwards, and in this case, the third hinge bracket 115 presses the guide link 530 of the suspension device 500 downwards, and the guide link 530 is moved downwards by a designated distance while compressing the spring 520 in the guide pipe 510.

On the other hand, when the forward or rearward rotation of the seat frame 100 including the first seat frame part 110 and the second seat frame part 120 has been completed, the boundary between the first seat frame part 110 and the second seat frame part 120 is slightly moved upwards, and in this case, the guide link 530 in the guide pipe 510 is rectilinearly moved upwards due to the elastic restoring force of the spring 520, and thus, supports the boundary between the first seat frame part 110 and the second seat frame part 120 while pushing the boundary between the first seat frame part 110 and the second seat frame part 120 upwards.

As such, when the seat frame 100 including the first seat frame part 110 and the second seat frame part 120 is rotated forwards or rearwards, or when the forward or rearward rotation of the seat frame 100 including the first seat frame part 110 and the second seat frame part 120 has been completed, the suspension device 500 supports the boundary between the first seat frame part 110 and the second seat frame part 120, thereby being capable of preventing movement of the seat frame 100 and dispersing the load of passengers.

According to the present disclosure, a first leg rest frame 130 also used as a headrest frame is mounted at the distal end of the first seat frame part 110, and a second leg rest frame 140 also used as a headrest frame is mounted at the distal end of the second seat frame part 120.

Therefore, when the first seat frame part 110 is used as a seat cushion and the second seat frame part 120 is used as a seat back, the first leg rest frame 130 may be used as a leg rest and the second leg rest frame 140 may be used as a headrest.

On the other hand, when the first seat frame part 110 is used as a seat back and the second seat frame part 120 is used as a seat cushion, the first leg rest frame 130 may be used as a headrest and the second leg rest frame 140 may be used as a leg rest.

For this purpose, the first seat frame part 110 and the second seat frame part 120 may be provided to have the same shape, and the first leg rest frame 130 and the second leg rest frame 140 may be provided to have the same shape.

Here, the first leg rest frame 130 is mounted at first mounting brackets 131, mounted at the distal end of the first seat frame part 110 by welding or the like, by a first hinge shaft 132 such that the angle of the first leg rest frame 130 is adjustable, and the second leg rest frame 140 is mounted at second mounting brackets 141, mounted at the distal end of the second seat frame part 120 by welding or the like, by a second hinge shaft 142 such that the angle of the second leg rest frame 140 is adjustable.

Further, a second gear box 134 connected to the output shaft of a second motor 133 is mounted as a driving unit configured to adjust the angle of the first leg rest frame 130 on the first hinge shaft 132 so as to transmit rotating force to the first hinge shaft 132, and a third gear box 144 connected to the output shaft of a third motor 143 is mounted as a driving unit configured to adjust the angle of the second leg rest frame 140 on the second hinge shaft 142 so as to transmit rotating force to the second hinge shaft 142.

Hereinafter, the operating flow of the seat for a vehicle having the above-described configuration according to the present disclosure will be described.

Figure 4:
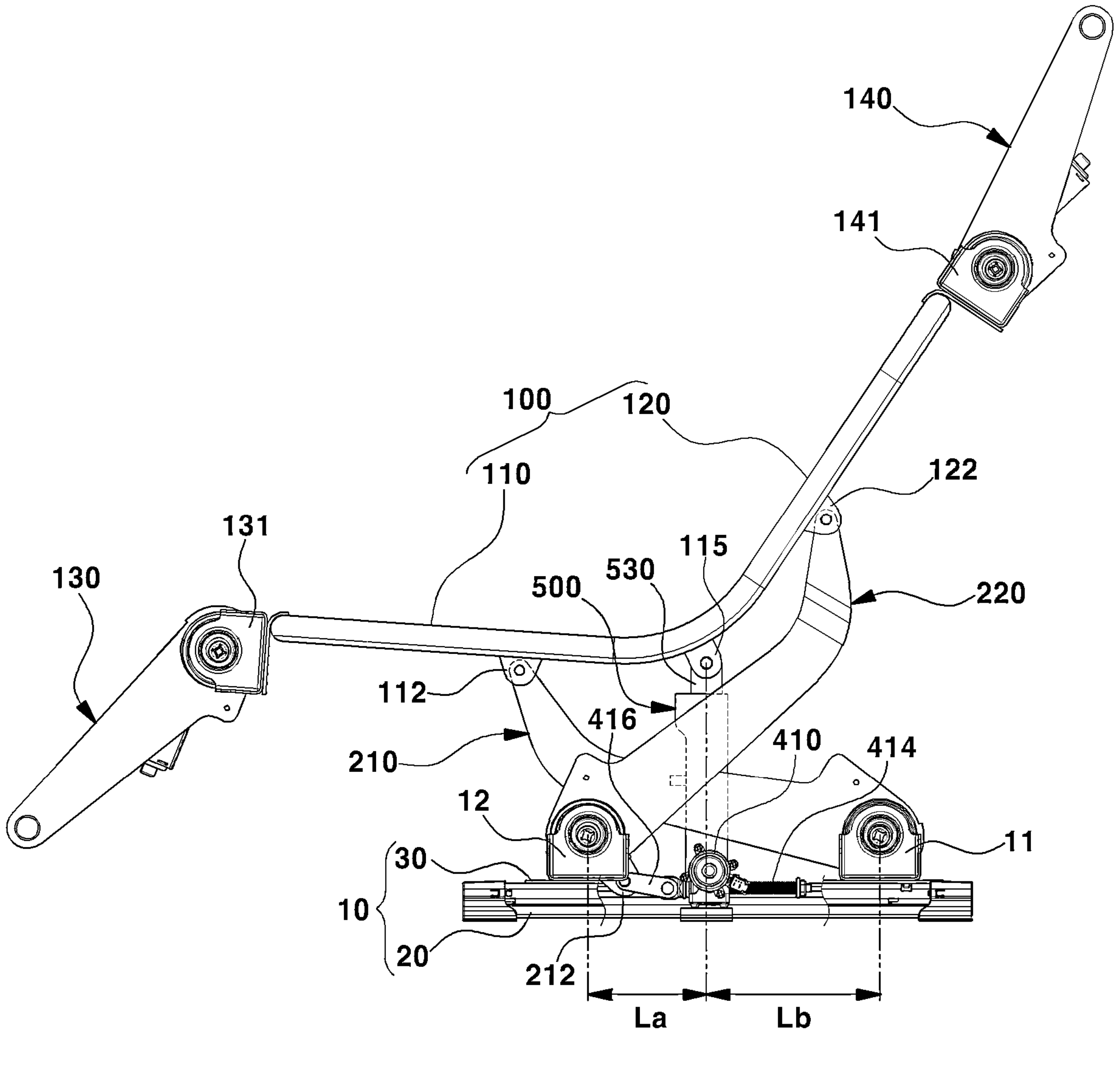
FIG. 4 is a side view of the seat for a vehicle according to the present disclosure, in the state in which the seat for a vehicle is adjusted so as to face towards the front part of a vehicle.

FIG. 4 is a side view of the seat for a vehicle according to the present disclosure, in the state in which the seat for a vehicle is adjusted so as to face the front part of a vehicle.

The seat for a vehicle according to the present disclosure may be adjusted so as to face the front part of the vehicle.

For this purpose, when rotation driving force of the first motor 410 of the driving device in one direction is transmitted to the lead screw 414 through the first gear box 412, the lead screw 414 is simultaneously rotated in the corresponding direction and moved maximally rearwards, and subsequently, the push-pull link 416 is moved rearwards and pulls the second connection plate 222 rearwards.

Therefore, because the second connection plate 222 is integrally connected to the front ends of the second support links 220 provided in a pair and the front ends of the second support links 220 are connected to the second support brackets 12 mounted at the front parts of the movable rails 30 using hinges, when the second connection plate 222 is pulled rearwards, the movable rails 30 are moved rearwards by a designated distance along the stationary rails 20, and simultaneously, the front ends of the second support links 220 and the second support brackets 12 are moved rearwards by the same distance together with the movable rails 30.

Further, because the rear ends of the first support links 210 are connected to the first support brackets 11 mounted at the rear parts of the movable rails 30 using hinges, when the movable rails 30 are moved rearwards by the designated distance along the stationary rails 20, the rear ends of the first support links 210 and the first support brackets 11 are moved rearwards by the same distance together with the movable rails 30.

Here, as shown in FIG. 4, a distance La in the forward and rearward directions between a virtual vertical line extending downwards from the third hinge bracket 115 of the seat frame 100 and the centers of the second support brackets 12 becomes less than a distance Lb in the forward and rearward directions between the virtual vertical line extending downwards from the third hinge bracket 115 of the seat frame 100 and the centers of the first support brackets 11.

Therefore, the front ends of the first support links 210 are rotated downwards about the rear ends thereof hinge-coupled to the first support brackets 11, and the rear ends of the second support links 220 are rotated upwards about the front ends thereof hinge-coupled to the second support brackets 12.

Simultaneously, when the front ends of the first support links 210 are rotated downwards about the rear ends thereof, the first seat frame part 110 connected to the front ends of the first support links 210 using the hinges is rotated forwards so as to be adjusted to the position of a seat cushion on which a passenger may sit, and when the rear ends of the second support links 220 are rotated upwards about the front ends thereof, the second seat frame part 120 connected to the rear ends of the second support links 220 using the hinges is rotated forwards so as to be adjusted to the position of a seat back over which the passenger may lean.

Therefore, as shown in FIG. 4, the first seat frame part 110 is adjusted to the position of the seat cushion on which the passenger may sit and the second seat frame part 120 is adjusted to the position of the seat back over which the passenger may lean, and thereby, the seat for a vehicle may be adjusted so as to face the front part of the vehicle.

Here, when forward rotation of the seat frame 100 including the first seat frame part 110 and the second seat frame part 120 has been completed, the guide link 530 in the guide pipe 510 is rectilinearly moved upwards due to elastic restoring force of the spring 520, and thus, supports the boundary provided with the second hinge bracket 115 between the first seat frame part 110 and the second seat frame part 120 while pushing the boundary between the first seat frame part 110 and the second seat frame part 120 upwards.

Further, the first leg rest frame 130 may be spread through rotation of the first hinge shaft 132 due to driving of the second motor 133 and thus be used as a leg rest on which the passenger may put his/her legs, and simultaneously, the second leg rest frame 140 may be spread through rotation of the second hinge shaft 143 due to driving of the third motor 143 and thus be used as a headrest which may support the passenger's head.

As such, when the first seat frame part 110 is used as the seat cushion and the second seat frame part 120 is used as the seat back, the first leg rest frame 130 may be used as the leg rest and the second leg rest frame 140 may be used as the headrest.

Figure 5:
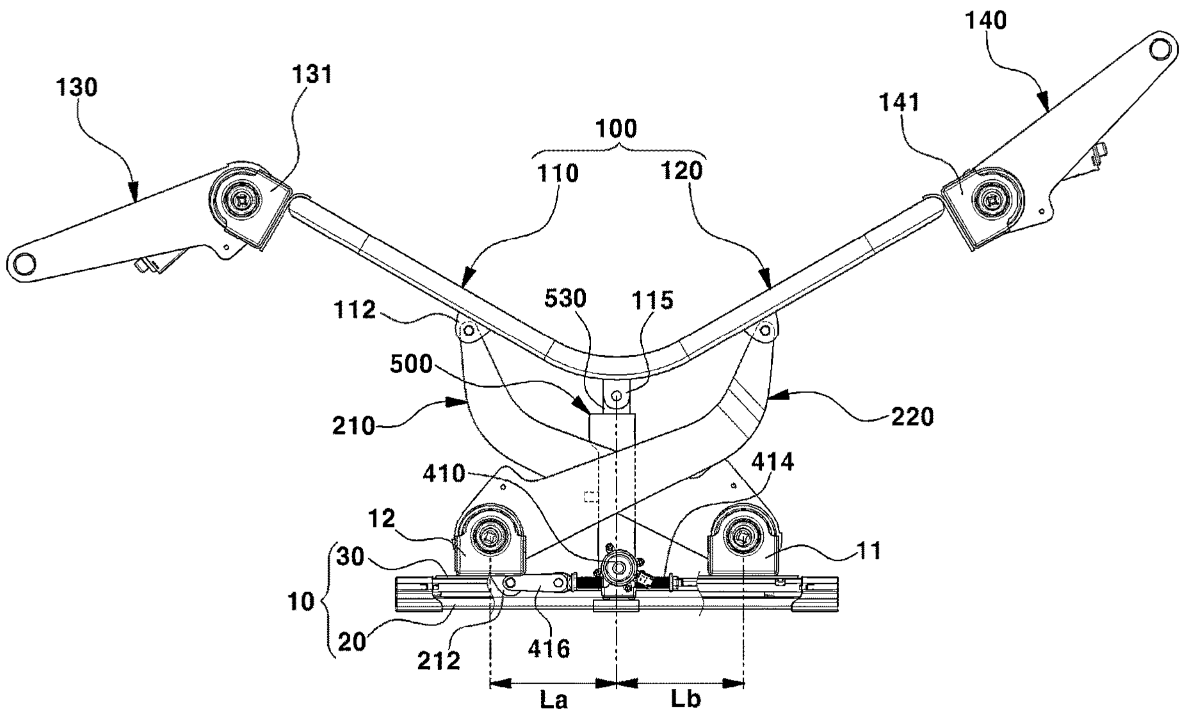
FIG. 5 is a side view of the seat for a vehicle according to the present disclosure, in the state in which the seat for a vehicle is adjusted to a relaxed comfort posture.

FIG. 5 is a side view of the seat for a vehicle according to the present disclosure, in the state in which the seat for a vehicle is adjusted to a relaxed comfort posture.

The seat for a vehicle according to the preset disclosure in the state in which the seat for a vehicle is adjusted so as to face the front part of the vehicle or in the state in which the seat for a vehicle is adjusted so as to face the rear part of the vehicle, may be easily adjusted to the relaxed comfort posture as if a passenger lies down to rest.

In order to assist in understating of the present disclosure, operation of converting the seat for a vehicle from the state in which the seat for a vehicle is adjusted so as to face the front part of the vehicle, as shown in FIG. 4, to the relaxation comfort gesture will be exemplarily described below.

First, when rotation driving force of the first motor 410 of the driving device in the other direction is transmitted to the lead screw 414 through the first gear box 412, the lead screw 414 is simultaneously rotated in the corresponding direction and moved forwards, and subsequently, the push-pull link 416 is moved forwards and pushes the second connection plate 222 forwards.

Therefore, because the second connection plate 222 is integrally connected to the front ends of the second support links 220 provided in a pair and the front ends of the second support links 220 are connected to the second support brackets 12 mounted at the front parts of the movable rails 30 using the hinges, when the second connection plate 222 is pushed forwards, the movable rails 30 are moved forwards by a designated distance along the stationary rails 20, and simultaneously, the front ends of the second support links 220 and the second support brackets 12 are moved forwards by the same distance together with the movable rails 30.

Further, because the rear ends of the first support links 210 are connected to the first support brackets 11 mounted at the rear parts of the movable rails 30 using the hinges, when the movable rails 30 are moved forwards by the designated distance along the stationary rails 20, the rear ends of the first support links 210 and the first support brackets 11 are moved forwards by the same distance together with the movable rails 30.

Here, as shown in FIG. 5, the distance La in the forward and rearward directions between the virtual vertical line extending downwards from the third hinge bracket 115 of the seat frame 100 and the centers of the second support brackets 12 becomes equal to the distance Lb in the forward and rearward directions between the virtual vertical line extending downwards from the third hinge bracket 115 of the seat frame 100 and the centers of the first support brackets 11.

Therefore, the front ends of the first support links 210 are rotated upwards about the rear ends thereof connected to the first support brackets 11 using the hinges, the rear ends of the second support links 220 are rotated downwards about the front ends thereof connected to the second support brackets 12 using the hinge, and thereby, the height of the front ends of the first support links 210 and the height of the rear ends of the second support links 220 become almost equal to each other.

Here, the first seat frame part 110 connected to the front ends of the first support links 210 using the hinges may be lifted upwards and rotated rearwards so as to implement tilting of the seat cushion, and the second seat frame part 120 connected to the rear ends of the second support links 220 using the hinges may be rotated rearwards so as to implement reclining of the seat back.

As such, the tilting operation of the first seat frame part 110 used as the seat cushion and the reclining operation of the second seat frame part 120 used as the seat back are performed, thereby being capable of easily implementing the relaxed comfort posture as if a passenger lies down to rest.

When the seat frame 100 including the first seat frame part 110 and the second seat frame part 120 is rotated rearwards so as to implement the relaxed comfort posture, the boundary between the first seat frame part 110 and the second seat frame part 120 is slightly moved downwards, and in this case, the third hinge bracket 115 presses the guide link 530 of the suspension device 500 downwards, and the guide link 530 is moved downwards by a designated distance while compressing the spring 520 in the guide pipe 510, and thus supports the seat frame 100 without movement.

Figure 6:
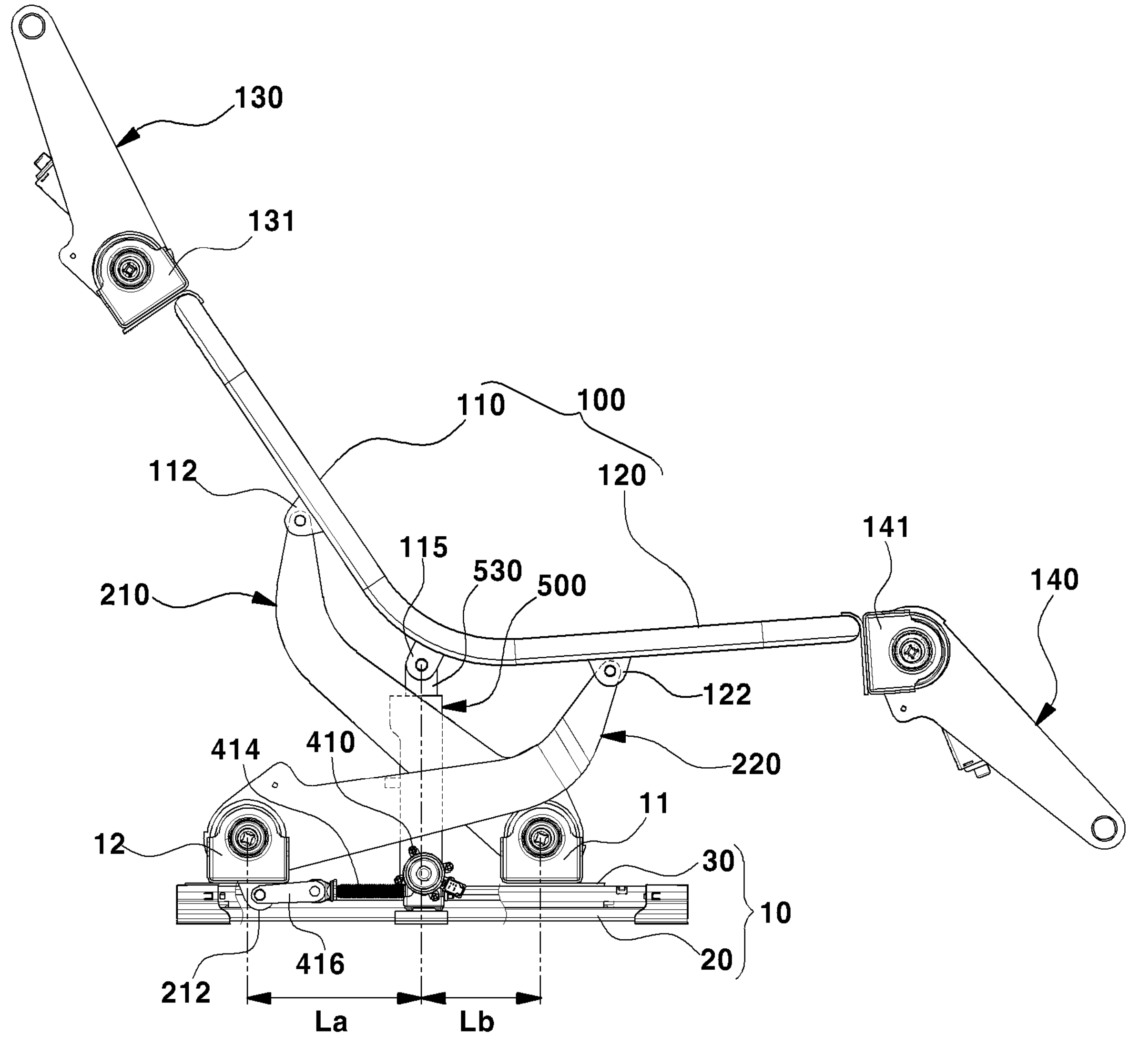
FIG. 6 is a side view of the seat for a vehicle according to the present disclosure, in the state in which the seat for a vehicle is adjusted so as to face the rear part of the vehicle.

FIG. 6 is a side view of the seat for a vehicle according to the present disclosure, in the state in which the seat for a vehicle is adjusted so as to face the rear part of the vehicle.

The seat for a vehicle according to the present disclosure may be adjusted so as to face the rear part of the vehicle, in order to implement a facing mode in which the passenger sitting on the seat for a vehicle faces a passenger sitting on another seat for a vehicle placed just behind the seat for a vehicle.

First, when rotation driving force of the first motor 410 of the driving device in the other direction is transmitted to the lead screw 414 through the first gear box 412, the lead screw 414 is simultaneously rotated in the corresponding direction and moved maximally forwards, and subsequently, the push-pull link 416 is moved forwards and pushes the second connection plate 222 forwards.

Therefore, because the second connection plate 222 is integrally connected to the front ends of the second support links 220 provided in a pair and the front ends of the second support links 220 are connected to the second support brackets 12 mounted at the front parts of the movable rails 30 using the hinges, when the second connection plate 222 is pushed maximally forwards, the movable rails 30 are moved forwards by a designated distance along the stationary rails 20, and simultaneously, the front ends of the second support links 220 and the second support brackets 12 are moved forwards by the same distance together with the movable rails 30.

Further, because the rear ends of the first support links 210 are connected to the first support brackets 11 mounted at the rear parts of the movable rails 30 using the hinges, when the movable rails 30 are moved forwards by the designated distance along the stationary rails 20, the rear ends of the first support links 210 and the first support brackets 11 are moved forwards by the same distance together with the movable rails 30.

Here, as shown in FIG. 6, the distance La in the forward and rearward directions between the virtual vertical line extending downwards from the third hinge bracket 115 of the seat frame 100 and the centers of the second support brackets 12 becomes greater than the distance Lb in the forward and rearward directions between the virtual vertical line extending downwards from the third hinge bracket 115 of the seat frame 100 and the centers of the first support brackets 11.

Therefore, the front ends of the first support links 210 are rotated upwards about the rear ends thereof connected to the first support brackets 11 using the hinges, and the rear ends of the second support links 220 are rotated downwards about the front ends thereof connected to the second support brackets 12 using the hinges.

Simultaneously, when the front ends of the first support links 210 are rotated upwards about the rear ends thereof, the first seat frame part 110 connected to the front ends of the first support links 210 using the hinges is rotated rearwards so as to be adjusted to the position of a seat back over which a passenger may lean, and when the rear ends of the second support links 220 are rotated downwards about the front ends thereof, the second seat frame part 120 connected to the rear ends of the second support links 220 using the hinges is rotated downwards so as to be adjusted to the position of a seat cushion on which the passenger may sit.

Therefore, as shown in FIG. 6, the first seat frame part 110 is adjusted to the position of the seat back over which the passenger may lean and the second seat frame part 120 is adjusted to the position of seat cushion on which the passenger may sit, and thereby, the seat for a vehicle may be adjusted so as to face the rear part of the vehicle and the passenger sitting on the seat for a vehicle may face a passenger sitting on another seat for a vehicle placed just behind the seat for a vehicle.

Here, when rearward rotation of the seat frame 100 including the first seat frame part 110 and the second seat frame part 120 has been completed, the guide link 530 in the guide pipe 510 is rectilinearly moved upwards due to elastic restoring force of the spring 520, and thus, supports the boundary provided with the second hinge bracket 115 between the first seat frame part 110 and the second seat frame part 120 while pushing the boundary between the first seat frame part 110 and the second seat frame part 120 upwards.

Further, the first leg rest frame 130 may be rotated rearwards through rotation of the first hinge shaft 132 due to driving of the second motor 133 and thus be used as a headrest which may support the passenger's head, and simultaneously, the second leg rest frame 140 may be spread through rotation of the second hinge shaft 143 due to driving of the third motor 143 and thus be used as a leg rest on which the passenger may put his/her legs.

As such, when the first seat frame part 110 is used as the seat back and the second seat frame part 120 is used as the seat cushion, the first leg rest frame 130 may be used as the headrest and the second leg rest frame 140 may be used as the leg rest.

As described above, the seat frame 100 including the first seat frame part 110 and the second seat frame part 120 may be rotated forwards and rearwards as in the seesaw motion about the shaft of the vehicle in the width direction thereof using the first support links 210, the second support links 220, etc., and thus, the seat for a vehicle according to the present disclosure may be easily adjusted to the facing mode posture, in which passengers sit facing each other, the relaxed comfort posture, etc.

As is apparent from the above description, a seat for a vehicle according to the present disclosure may provide the following effects.

First, the seat for a vehicle according to the present disclosure may be rotated forwards and rearwards as in the seesaw motion about the shaft of a vehicle in the width direction thereof, and may thus be easily adjusted to the facing mode posture, in which passengers sit facing each other, the relaxed comfort posture, etc.

Second, the seat for a vehicle according to the present disclosure may provide a seat swiveling effect using a smaller number of parts and a simple structure compared to the conventional H shaft-based seat swiveling mechanism requiring a large number of parts and having a complicated structure.

Third, the seat for a vehicle according to the present disclosure may be rotated forwards and rearwards about the shaft of the vehicle in the width direction thereof, thereby being capable of easily implementing the facing mode posture, the relaxed comfort posture, etc., while eliminating interference with peripheral parts (for example, a console, a door trim, a center pillar, etc.).

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A seat for a vehicle comprising:

a seat frame configured such that a first seat frame part and a second seat frame part are formed integrally with each other at a predetermined angle;

a pair of seat rails, each comprising a stationary rail and a movable rail mounted on the stationary rail so as to be movable forwards and rearwards;

a pair of first support links provided with front ends connected to the first seat frame part using hinges and rear ends connected to rear parts of the movable rails of the seat rails using hinges;

a pair of second support links provided with front ends connected to front parts of the movable rails of the seat rails using hinges and rear ends connected to the second seat frame part using hinges; and a driving device fixedly mounted on a support plate connected to the stationary rails so as to move either the pair of first support links or the pair of second support links, wherein the first and the second seat frame parts are configured to switch positions with each other such that any of the first seat frame part and the second seat frame part is used as a seat cushion or a seatback, and wherein the pair of first support links are disposed to be inclined downwards from the front ends thereof to the rear ends thereof, the pair of second support links are disposed to be inclined downwards from the rear ends thereof to the front ends thereof, and thus, the pair of first support links and the pair of second support links are disposed to cross each other.

2. The seat of claim 1, wherein a pair of first hinge brackets each hinge-coupled to a corresponding front end of each of the pair of first support links are provided under the first seat frame part, a pair of second hinge brackets each hinge-coupled to a corresponding rear end of each of the pair of second support links are provided under the second seat frame part, and a third hinge bracket is hinge-connected to an underside of a crossbar extending between left and right boundaries of the first seat frame part and the second seat frame part.

3. The seat of claim 2, wherein a distance between the pair of first hinge brackets and the third hinge bracket and a distance between the pair of second hinge brackets and the third hinge bracket are set to be equal to each other.

4. The seat of claim 1, wherein a rear end of each of the pair of first support links is hinge-coupled to a corresponding one of a pair of first support brackets mounted at the rear part of a corresponding movable rail, and a front end of each of the pair of second support links is hinge-coupled to a corresponding one of a pair of second support brackets mounted at the front part of a corresponding movable rail.

5. The seat of claim 1, wherein a first leg rest frame to be also used as a headrest frame is mounted at a distal end of the first seat frame part, and a second leg rest frame to be also used as a headrest frame is mounted at a distal end of the second seat frame part.

6. The seat of claim 5, wherein the first leg rest frame is mounted at a first mounting brackets mounted at the distal end of the first seat frame part such that an angle of the first leg rest frame is adjustable by a first hinge shaft of the hinge bracket, and the second leg rest frame is mounted at second mounting brackets mounted at the distal end of the second seat frame part by a second hinge shaft such that an angle of the second leg rest frame is adjustable.

7. The seat of claim 6, wherein a second gear box connected to an output shaft of a second motor is mounted on the first hinge shaft so as to transmit rotating force to the first hinge shaft, and a third gear box connected to an output shaft of a third motor is mounted on the second hinge shaft so as to transmit rotating force to the second hinge shaft.

8. The seat of claim 5, wherein the first seat frame part and the second seat frame part are provided to have the same shape, and the first leg rest frame and the second leg rest frame are provided to have the same shape.

9. A seat for a vehicle comprising:

a seat frame configured such that a first seat frame part and a second seat frame part are formed integrally with each other at a predetermined angle;

a pair of seat rails, each comprising a stationary rail and a movable rail mounted on the stationary rail so as to be movable forwards and rearwards;

a pair of first support links provided with front ends connected to the first seat frame part using hinges and rear ends connected to rear parts of the movable rails of the seat rails using hinges;

a pair of second support links provided with front ends connected to front parts of the movable rails of the seat rails using hinges and rear ends connected to the second seat frame part using hinges; and a driving device fixedly mounted on a support plate connected to the stationary rails so as to move either the pair of first support links or the pair of second support links, wherein the first and the second seat frame parts are configured to switch positions with each other such that any of the first seat frame part and the second seat frame part is used as a seat cushion or a seatback, and wherein the driving device comprises:

a first motor mounted on the support plate;

a first gear box mounted at an output shaft of the first motor;

a lead screw coupled to the first gear box so as to be movable forwards or rearwards;

a first connection plate configured to connect the rear ends of the first support links provided in a pair;

a second connection plate configured to connect the front ends of the second support links provided in a pair; and a push-pull link configured to connect a rear end of the lead screw and the first connection plate, or configured to connect a front end of the lead screw and the second connection plate.

10. A seat for a vehicle comprising:

a seat frame configured such that a first seat frame part and a second seat frame part are formed integrally with each other at a predetermined angle;

a pair of seat rails, each comprising a stationary rail and a movable rail mounted on the stationary rail so as to be movable forwards and rearwards;

a pair of first support links provided with front ends connected to the first seat frame part using hinges and rear ends connected to rear parts of the movable rails of the seat rails using hinges;

a pair of second support links provided with front ends connected to front parts of the movable rails of the seat rails using hinges and rear ends connected to the second seat frame part using hinges;

a driving device fixedly mounted on a support plate connected to the stationary rails so as to move either the pair of first support links or the pair of second support links; and a suspension device fixedly mounted on the support plate connected to the stationary rails of the seat rails, and connected to the seat frame using a hinge, wherein the first and the second seat frame parts are configured to switch positions with each other such that any of the first seat frame part and the second seat frame part is used as a seat cushion or a seatback, and wherein the suspension device is connected to a center part of the seat frame where the first seat frame and the second seat frame are connected each other at the predetermined angle.

11. The seat of claim 10, wherein the suspension device is connected to a crossbar extending between left and right boundaries of the first seat frame part and the second seat frame part using the hinge.

12. The seat of claim 10, wherein the suspension device comprises:

a guide pipe mounted on the support plate and configured to have a predetermined height;

a spring installed in the guide pipe so as to be compressible; and a guide link an upper end of which is connected to a third hinge bracket disposed on an underside of a crossbar extending between left and right boundaries of the first seat frame part and the second seat frame part, and a lower end of which is inserted into the guide pipe and connected to an upper end of the spring, so as to be rectilinearly moved upwards and downwards.

13. The seat of claim 12, wherein, in order to assure upward and downward rectilinear movement of the guide link, a guide hole configured to extend in a vertical direction is formed in the guide pipe, and a guide pin inserted into the guide hole protrudes from the guide link.

* * * * *